United States Patent [19]
Nugent

[11] 4,120,285
[45] Oct. 17, 1978

[54] MODULAR TUBULAR SOLAR ENERGY COLLECTOR APPARATUS

[75] Inventor: Duane C. Nugent, Perrysburg, Ohio
[73] Assignee: Owens-Illinois, Inc., Toledo, Ohio
[21] Appl. No.: 737,364
[22] Filed: Nov. 1, 1976
[51] Int. Cl.² .............................................. F24J 3/02
[52] U.S. Cl. .................... 126/271; 126/270
[58] Field of Search ............... 126/270, 271; 237/1 A; 165/142, 48, 47, 171, 168, 178; 240/52.1, 71, 72, 78 D

[56] References Cited

U.S. PATENT DOCUMENTS

| | | | |
|---|---|---|---|
| 980,505 | 1/1911 | Emmet | 126/271 |
| 1,068,650 | 7/1913 | Harrison | 126/271 |
| 1,575,309 | 3/1926 | Anderson | 126/271 |
| 1,683,266 | 9/1928 | Shipman | 126/271 |
| 1,696,003 | 12/1928 | Harvey | 126/271 |
| 1,880,938 | 10/1932 | Emmet | 126/270 |
| 1,946,184 | 2/1934 | Abbot | 126/271 |
| 1,951,403 | 3/1934 | Goddard | 126/271 |
| 1,989,999 | 2/1935 | Niederle | 126/271 |
| 2,133,649 | 10/1938 | Abbot | 126/271 |
| 2,141,330 | 12/1938 | Abbot | 126/271 X |
| 2,205,378 | 6/1940 | Abbot | 126/271 |
| 2,213,894 | 9/1940 | Barry | 126/271 |
| 2,247,830 | 7/1941 | Abbot | 126/271 |
| 2,460,482 | 1/1949 | Abbot | 126/271 |
| 2,872,915 | 2/1959 | Bowen | 126/271 |
| 2,917,817 | 12/1959 | Tabor | 29/180 |
| 3,227,153 | 1/1966 | Godel et al. | 126/271 |
| 3,853,114 | 12/1914 | Taydos | 126/271 |
| 3,952,724 | 4/1976 | Pei | 165/142 X |
| 3,960,136 | 6/1976 | Moan et al. | 126/271 |
| 4,002,160 | 1/1977 | Mather, Jr. | 126/271 |
| 4,016,860 | 4/1977 | Moan | 126/270 |
| 4,018,215 | 4/1977 | Pei | 126/270 |
| 4,027,653 | 6/1977 | Meckler | 126/270 X |
| 4,030,477 | 6/1977 | Smith | 126/270 |
| 4,033,327 | 7/1977 | Pei | 165/142 |
| 4,043,318 | 8/1977 | Pei | 165/166 X |

FOREIGN PATENT DOCUMENTS 2,296,826 7/1976 France.

OTHER PUBLICATIONS

H. Tabor, "Selective Radiation, I Wavelength Discrimination Bulletin of the Research Council of Isreal,", vol. 5A, 1956 pp. 119-1928.
H. Tabor, J. Harris, H. Weinberger and B. Doron, "Further Studies on Selective Block Coatings," United Nations Conference on New Sources on Energy, Apr. 21, 1961, pp. 618-624.

*Primary Examiner*—William F. O'Dea
*Assistant Examiner*—Larry Jones
*Attorney, Agent, or Firm*—John R. Nelson; Myron E. Click; David H. Wilson

[57] ABSTRACT

The disclosure relates to a modular form of solar energy collector apparatus in which several double-wall glass tube collectors, each with vacuum jacket, depend from opposite sides of an elongated manifold. The manifold includes split halves of foamed polymer insulation and rigid fiberglass reinforced skin thereon, assembled about closed-looped, serpentine liquid carrying tubes preferably of metal or glass in U-tube configurations depending from the manifold halves and extending into the larger double-walled glass tubes, the serpentine tube being connected, respectively, into inlet and outlet header pipes. The interior chamber of the collector tubes is closed by the manifold, thereby enclosing a part of each U-tube branch of the serpentine in a non-turbulent air space. Solar energy collected on the absorber surface of the inner glass tube wall is transmitted to the U-tube and liquid therein. The U-tube within the collectors is blackened and non-reflecting. Principal heat transfer from absorber to U-tube is by radiation with some conduction and convection transfer. The heat transfer liquid is entirely within a closed circuit, which avoids leaks, reduces weight, and cycle time of the liquid is reduced to a fraction of other liquid systems.

The manifold and tubes are fastened to a support structure of novel construction enabling fabrication as a module and mounting on a solar exposure of a structure such as a roof, wall or frame. Several modules are interconnectable to desired capacity for a particular solar powered heating or cooling system.

41 Claims, 12 Drawing Figures

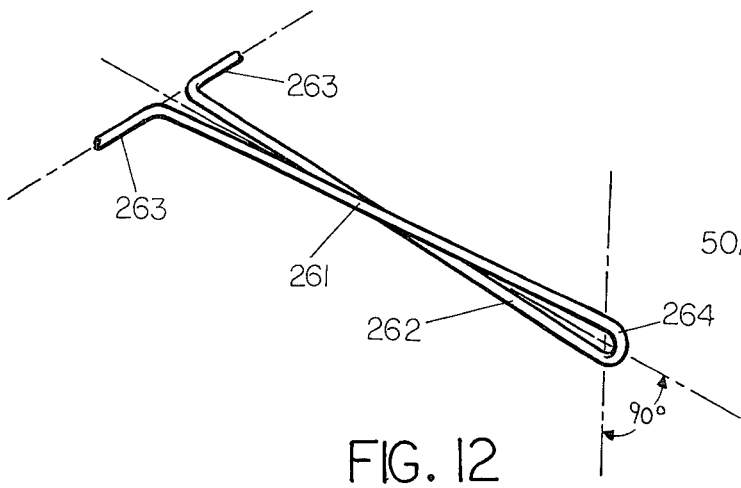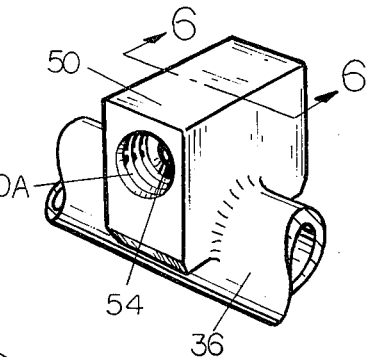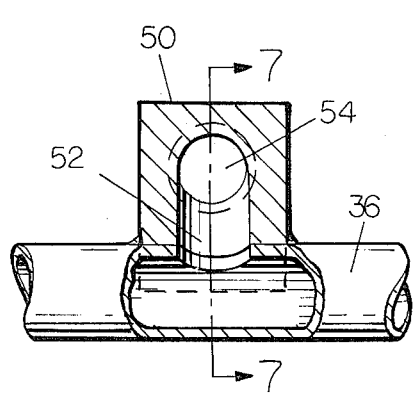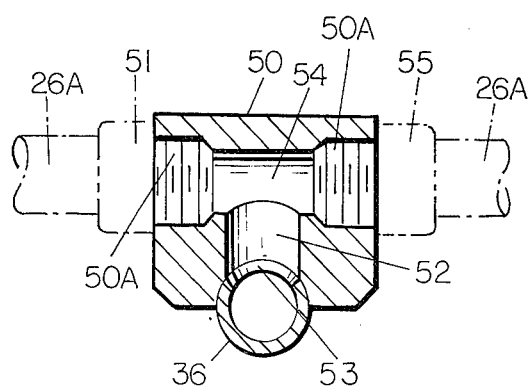

MODULAR TUBULAR SOLAR ENERGY COLLECTOR APPARATUS

The present invention relates to apparatus for collection of solar radiation energy and transmittal of that energy as heat in a liquid media for purposes of utilization in an energy consumption system.

BACKGROUND OF THE INVENTION

Efficient collectors of tubular variety are disclosed in U.S. Pat. No. 3,952,724 and commonly owned, copending application Ser. No. 634,714 filed Nov. 24, 1975 (now U.S. Pat. No. 4,033,327), both setting forth inventions of Y. K. Pei in modern, advanced solar collector design. The prior collectors just referred to utilize, for the most part, a liquid media to absorb and transmit energy as heat collected on a tubular solar absorbing surface of a collector. The liquid is handled in a manifold for series flow distribution thereof into the interior chamber of a series of absorber tubes. To maintain the circuit leakproof, the collectors are sealed in the manifold and end pressure on the tube is provided in the structural support to bias the internal liquid pressure in the interior chamber of the absorber tube as arise at operating temperatures of the system. The collectors are constructed from glass tubing components and have an annular vacuum jacket between the outside tube wall and the inside, absorber tube wall. The liquid is freely introduced from the manifold into the absorber tube interior by a delivery tube circuit from which the liquid flows within the confines of the absorber tube body to the manifold. Breakage of the tubular collector, and in particular, breakage of the absorber tube; or unseating and leakage of one of the collector tubes from the manifold causes leakage or spillage of liquid and a resulting malfunction, or, at best, loss of efficient operation of one module segment of the system.

SUMMARY OF THE INVENTION

The object of the invention is to provide an improved advanced solar collection system in which a liquid heat exchange media is completely contained and circulated in a closed tubing circuit to and through the tubular glass collectors.

In the invention, an important aspect is the elimination of water tight seals on the end of the collector tube in the manifold without loss of fluid should leakage or breakage or the collector tube occur. Also, the system is capable of much higher operating pressure and temperature operation.

Another important feature of the invention is in the reduction of weight when filled and a lower time constant for liquid cycle circulation. The shorter time constant for the liquid cycle benefits the control over the heat collection output of the collector.

The basic structure of the collector tube of the invention consists in an elongated, double-walled glass tube that is closed at the one outer end and is open at the other end. The surface of the inner wall of the tube is covered with an absorption coating, preferably a wave length selective coating having the properties of high absorption and low emissivity. The walls are separated by an annular vacuum chamber to reduce conduction and convection loss. The liquid is completely contained in manifold and U-tubing as part of the closed circuit and the U-tube portion is inserted into the interior chamber of the absorber tube wall of the collector. The tubular collector is connected at its open end onto the manifold such that the interior chamber of the absorber tube in the collector is closed, such as by means of the manifold matrix. The liquid circulation system comprised of the U-tubing resides in a stagnant, or non-turbulent air spaced inside the collector and the radiant solar energy absorbed on the coating of the inner wall of the collector is transmitted as heat through radiation, conduction and natural convection transfer to the U-tube and the liquid circulated therein.

The invention also includes a split manifold member formed of a low density insulation body and a dense, non-porous and durable exterior skin. The manifold member supports and encloses the liquid closed circuit connected as a serpentine of tubing including several U-tubes in collectors and closure for the open end of the collector tubes. The serpentine tubing is connected to an internal, enclosed header pipe circuit for handling the incoming and outgoing liquid in the system. The manifold in the preferred embodiment herein disclosed includes integral support and mounting standards made as a part of the durable exterior skin covering for mounting the apparatus.

A further feature of the invention includes the modular mounting of the collectors on a frame incorporating into a modular unit the necessary elements of the collector, manifold (including the closed tubing circuit), reflector means and supports. The modular construction provided by the invention enables ground erection of a single module or in series grouping of modules on a framework ready for hoisting to the place of installation at a desired solar exposure. Installations are most prevalent atop of buildings or at elevated locations, and the ease of installation offered by the invention enhances erection and reliability of the installation.

Since the liquid is completely contained in tubing, hydrostatic testing may be performed as part of the installation procedure to assure a leak free system. This will be maintained until a tubing rupture occurs. Accordingly, the invention provides improved safety and maintenance advantages. If a glass collector tube is broken in service, it can be replaced without interrupting flow of the liquid or without any loss or spillage of the liquids; i.e. the system need not be shut down. The only loss in the system should a tube be broken would be a performance efficiency drop proportionate to the tube or tubes out of service.

As will be apparent, other objects and advantages will undoubtedly occur to persons skilled in the art from the following description and the accompanying drawings.

BRIEF DESCRIPTION OF THE DRAWINGS

FIG. 5 is an enlarged perspective view of the connector for the serpentine formation of tubing and one of the manifold header pipes;

FIG. 6 is a side elevational view, partly in section, of the connector taken along line 6–6 on FIG. 5;

FIG. 7 is a sectional view of the connector taken along line 7—7 on FIG. 6;

FIG. 8 is a side elevational view of the liquid U-tube portion of the serpentine tubing formation according to the first embodiment of the invention;

FIG. 9 is an end view of the U-tube shown on FIG. 8;

FIG. 10 is a side elevational view of a liquid U-tube conduit illustrating a further embodiment of the invention in which the U-tube is twisted to lie in a plane near its one end that is disposed 90 degrees in relation to the plane at its other end;

FIG. 11 is an end view of the U-tube shown on FIG. 10; and

FIG. 12 is a perspective view of the twisted U-tube embodiment shown on FIGS. 10 and 11.

DESCRIPTION

Figure 1:
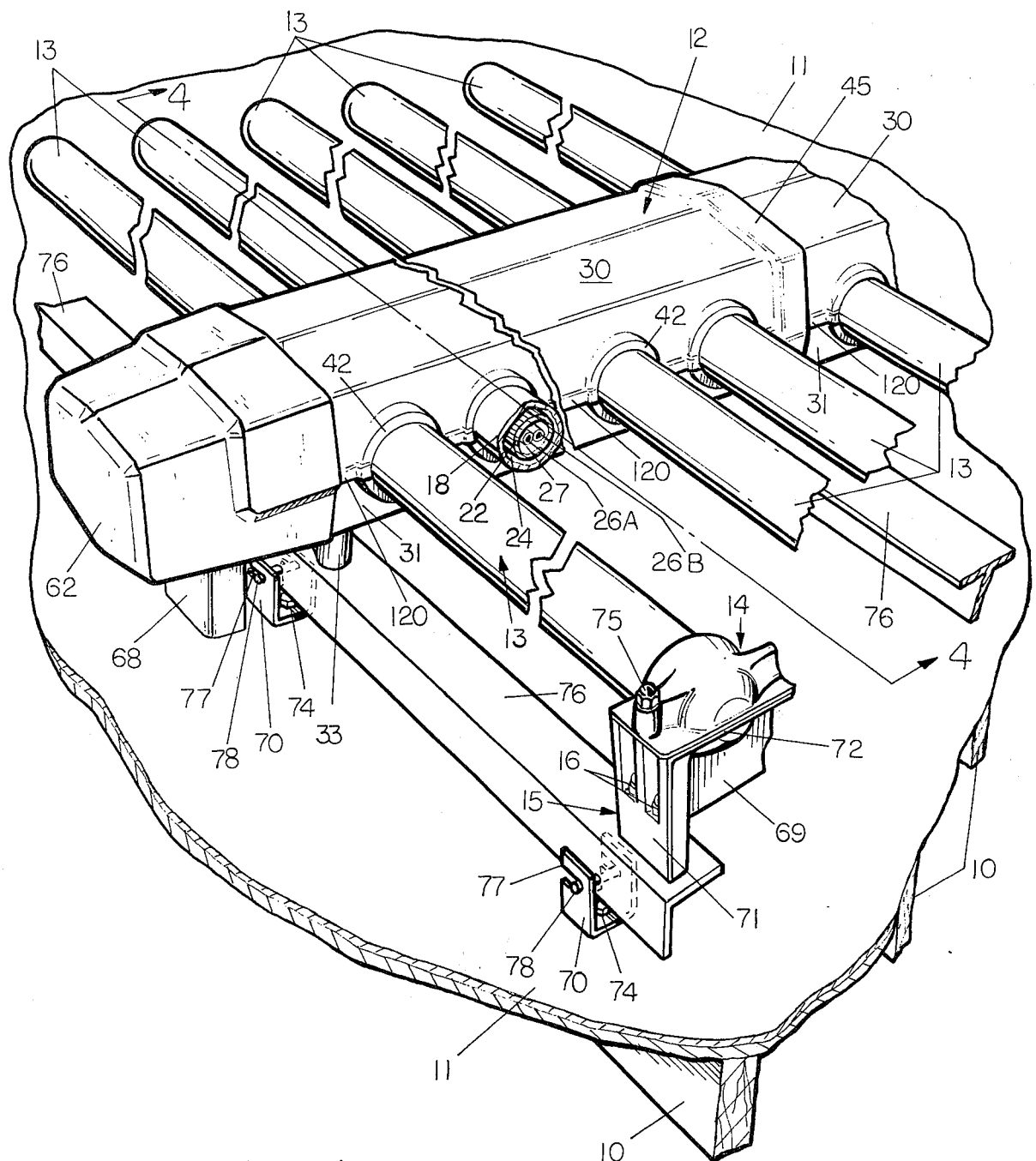
FIG. 1 is a perspective view, partly broken away, of the modular unit of improved solar energy collectors of the invention.

FIG. 1 illustrates an example of the solar energy apparatus module installed on a frame support surface 10, such as the roof or a solar exposed wall of a building. The surface 10 should be located with best exposure to the sun, such as a southern exposure in the Northern Hemisphere, etc.

A planar diffuse reflector 11 is positioned on top of the framework 10 and the solar collector module is mounted over the support 10 and reflector surface 11 and spaced above the upper surface of the latter a prescribed amount to enhance diffuse reflection of the sun's rays. The planar reflector 11 is like that disclosed in commonly owned, copending application Ser. No. 549,291, filed Feb. 12, 1975; now U.S. Pat. No. 4,002,162. Alternatively, shaped reflectors of the type disclosed in commonly owned, copending application Ser. No. 714,724, filed Aug. 16, 1976, may be employed in combination with the tubular collector elements hereof.

The module consists of the manifold assembly 12 and the plurality of tubular solar collector elements 13 which depend laterally from either side of manifold 12. The outer depending closed ends of collector elements 13 are held in an end support assembly 14 on an upstanding bracket 15 bolted at 16 onto the structural beams 76. For ease of illustration only one end support assembly 14 is shown, however, it is understood that each of the collector elements 13 is similarly mounted. The bracket 15 is preferably an integral piece spanning one side of the manifold for end support of all collector elements 13 depending along that side.

The manifold 12 is firmly fastened to the support frame by a pair of downwardly depending feed 33 (to be described later herein) of the manifold which are bolted onto the modular beams 76.

THE COLLECTOR

The collector element 13 is best described with reference to FIG. 4. An outer transparent glass cover tube 18 has a conically tapered outer end 19 and has a normally open opposite end 20. The glass wall of end 20 is annularly fused to the wall of the open end 21 of the smaller, inwardly disposed glass absorber tube 22. Tube 22 is formed prior to fabrication as an absorber of solar radiation energy by virtue of a surface layer of a wave length selective coating possessing properties of high absorption and low emissivity. Examples of such coating layer and its method of application on glass substrates is given in the commonly owned, copending application Ser. No. 695,538, filed June 14, 1976. The O.D. of tube 22 is, for example, on the order of 2 inches. Preferably, this absorbing coating layer is on the exterior surface of the glass absorber tube 22 which has a curved, closed end 23. The space 24 between tubes 18 and 22 is evacuated through an end tubulation 25 to a hard vacuum and shown tipped off in conventional manner after the vacuum is drawn. The vacuum in the space 24 eliminates convection and conduction heat loss of solar energy that is absorbed on the coating surface of tube 22.

To convey the energy absorbed on tube 22 as heat from the collector element and into use in a system to which the collector apparatus may be incorporated, the invention employs a bent, elongated U-tube 26 of relatively small OD (on the order of ⅜ or ½ inch diameter) which is inserted inside the larger diameter internal chamber 27 of absorber tube 22 (I.D. of about 1½ inches). The remaining area inside chamber 27 is a dead air space, or may be filled with any other gaseous heat transfer media selected for its properties in transfer of heat from the glass absorber tube wall to the surface of the U-tube 26. Air is a suitable example of such gaseous media.

Figure 3:
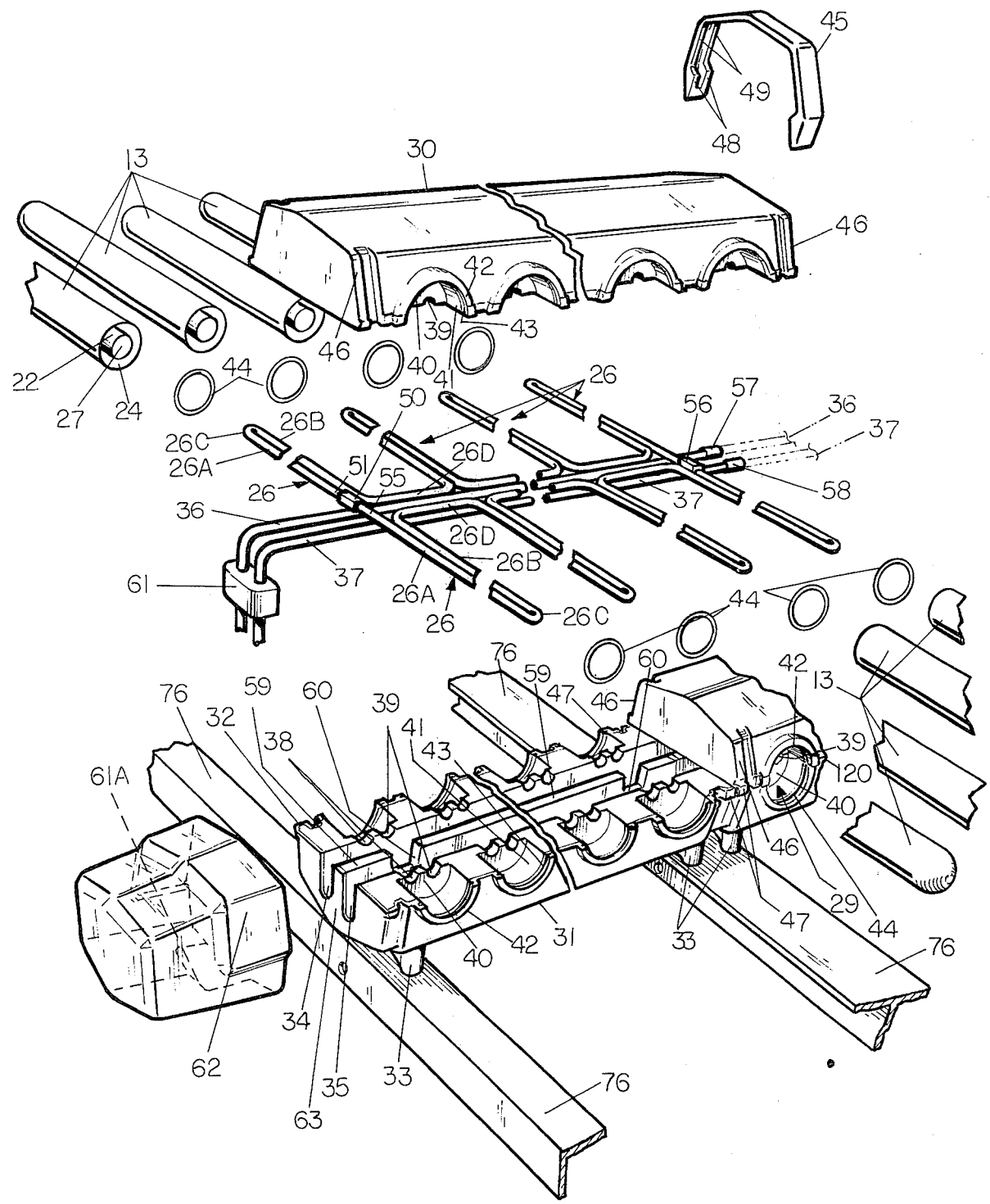
FIG. 3 is an exploded perspective view, in part, of one modular unit of the apparatus of the invention.

The U-tube 26 is preferably of ductile material which is preferably capable of withstanding high pressure and high temperature operating conditions and which may be readily bent to a rather sharp reverse bend 26C prescribing the one longitudinal extremity of tube 26. From the bend at the one end 26C, the two elongated side-by-side reaches 26A and 26B of the tubing extend to the open end of the absorber tube outside the end of the double-walled tubular collector element 13. Depending upon direction of flow induced in tube 26, the extremities of portions 26A and 26B provide the inlet and outlet for fluid circulation along the length of absorber tube 22. As will presently be described, the tubing 26 may be integral and contiguous, throughout, but at least must provide a continuous conduit for flow of a liquid heat exchange medium, for example, water, through certain successive elements 13 along the manifold 12. In the example given on the drawings, flow of the liquid in the system enters the collector element 13 at one end of leg 26B and exits at the end of leg 26A (FIG. 3).

The heat transfer in the collector element includes three mechanisms: (1) a radiant heat transfer from the inside of the glass absorber tube to the U-tube 26, (2) conduction through the stagnant air space which exists between the U-tube and the absorber tube, and (3) natural convection which may be present within the absorber tube. The radiation heat transfer is the dominant factor. Conduction through the gas film (stagnant air) is the second most important heat transfer, and assuming the tube legs 26A and 26B are disposed in horizontal side-by-side mode (as shown) convection is of minor importance. If the tube 26 is positioned such that the tube legs 26A and 26B are positioned in vertical mode (FIGS. 10–12), natural convection will contribute significantly to the heat transfer. In the horizontal mode, as illustrated on FIGS. 8 and 9 herein, natural convection will be essentially of negligible amount. Angular diposition of the U-tube between vertical and horizontal extremes will increase convection heat transfer directly in proportion to the increase in the angle from horizontal to vertical.

Considering radiation heat transfer as the most dominant factor, the U-tube should be made non-reflecting, which is accomplished by providing an opaque blackened outer surface on the U-tube to enhance its absorbitivity. The blackened layer on tube 26 may be a metal oxide layer, such as copper oxide, nickel oxide, zinc oxide or iron oxide, to name a few examples.

The preferred example of the invention is a copper tubing that is bent to U-tube 26 configuration and coated exteriorly with an opaque black oxide material to provide the non-reflecting property.

Figure 4:
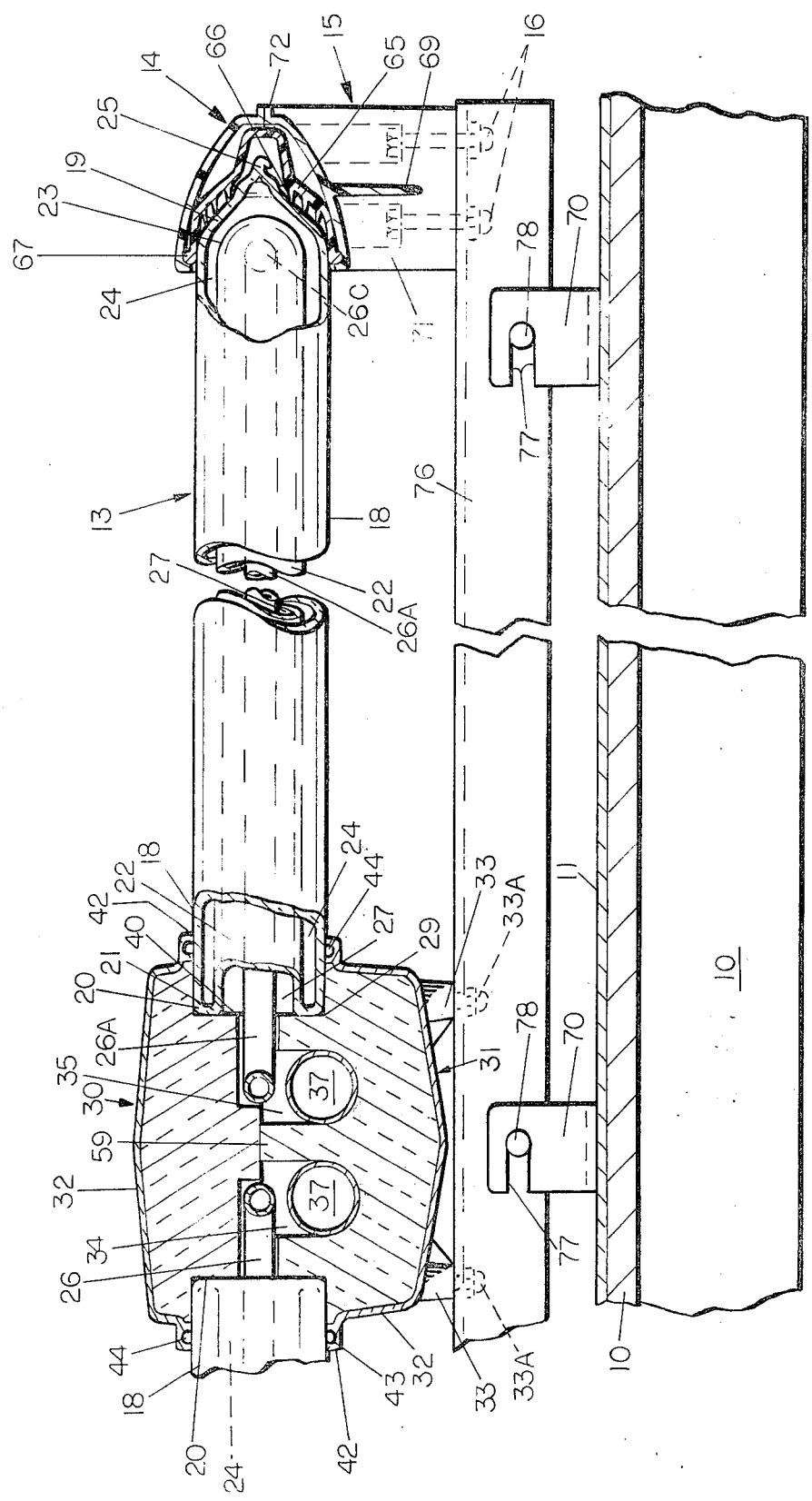
FIG. 4 is a sectional end elevational view taken along line 4—4 on FIG. 1.

As is apparent from the structure on FIG. 4, the open end of absorber tube 22 is closed from ambient atmosphere by the fit of the collector tube at this end into manifold 12 at the aperture 29 therein provided.

The collector just described performs favorably with the prior liquid filled collectors. Based on experiments, the collector of the present invention is very similar in performance efficiency to the tubular collector utilizing unconfined liquid (water) circulation throughout the interior chamber of absorber tube. The following is an example of performance in which the tubular collector 13 of this invention was simultaneously tested with a collector tube, similarly constructed, but in which the water was introduced into the interior of the absorber tube thereof by an open ended delivery tube filling the chamber of the absorber tube and allowed to flow along the absorber tube and out its open end into a manifold, such as the construction described in the commonly owned, copending application Ser. No. 599,558, filed July 28, 1975 (now U.S. Pat. No. 4,018,215).

TABLE 1

| Insolation Rate BTU/ hr.Ft.$^2$ | Water Temp. | Stagnant Air Tube | | Water Filled Tube | |
|---|---|---|---|---|---|
| | | Heat Collected BTU/hr. | Efficiency | Heat Collected BTU/hr. | Efficiency |
| 72 | 122° F | 50.7 | 52.3% | 50.7 | 52.3% |
| | 150 | 48.6 | 50.2 | 55.4 | 57.2 |
| | 173 | 45.7 | 47.2 | 38.1 | 39.3 |
| 114 | 122° F | 84.1 | 56.3% | 75.1 | 49.0% |
| | 150 | 76.2 | 49.7 | 74.0 | 47.4 |
| | 173 | 72.6 | 47.7 | 72.8 | 47.5 |
| | Overall average | | 50.6% | | 48.9% |

Insofar as the U-tube is concerned, its composition may be varied depending upon operating conditions for which the solar collector apparatus is designed. The structure of this invention, just described, enables a wide range of operating conditions of the collector, viz high pressure and high temperature conditions in the closed and confined heat exchange liquid system. Under these high temperature, high pressure conditions, the liquid confined in the system including the U-tubes and header pipes are capable of operating pressures up to 1600 PSI and to temperatures to the order of 600° F. Therefore, the U-tube may be constructed of most metals including copper, brass, steel or steel alloys, stainless steel, aluminum, to name the more common metal compositions. Also the U-tube may be made of glass which possesses good inert properties in handling a heat exchange liquid, such as water.

The preferred construction of the tubing serpentine and header pipes is steel tubing, principally for the sake of strength and cost. Copper tubing, as earlier indicated, is also a very satisfactory material for this part of the apparatus.

The tubing system of the apparatus provides a shortened residence time in the collectors and provides the benefit of better control in the overall system for utilization of the energy. Weight reduction too is an important factor in the invention. As an example, the liquid filled collector system, such as described in the above-mentioned patent and application of common ownership, utilizes 9 gallons of water in a twenty-four tube collector module. The present invention constructed with ⅜ inches diameter tubing of the same size module holds 1.5 gallons of liquid in the serpentine tubing plus 0.33 gallon in the 1 inch diameter header pipes. For flow rate of 0.3 gallon per minute, the residence time of the liquid in such module is reduced from 30 minutes in the prior liquid-filled collector system to 3.6 minutes in the present invention.

Under certain lower pressure/temperature operations, the U-tube may also be made of rigid plastics in common use today, however, care in selection of these must be taken because of the possibility of failure or rupture under too high pressure or temperature conditions in the liquid circulated through the U-tube.

To reduce radiation loss to a minimum in the U-tube, any of the materials suggested may be surface coated or clad by known techniques to provide a blackened, non-reflective coating on the U-tube, at least over that portion of the U-tube contained within the collector element 13.

Accordingly, without sacrifice of performance efficiency, under the present invention the advantages alluded to herein are practically obtainable.

In the description of the invention herein and illustrated on the drawings, the U-tube structure is integrally constructed for a series of the tubular collectors 13 in a module for the sake of convenience. However, the serpentine U-tube series may be constructed of pieces of tubing connected together, and certain portions thereof may be made of different materials of sufficient strength to reduce cost in construction of the invention. For example, each of the U-tubes in the collector may be fabricated of copper tubing, as indicated, and these connected together into the serpentine series, as illustrated, by tubing of a different, lower cost material. In this regard, certain combinations of materials to achieve cost effectiveness of the system are well within the skill of artisans in this field.

Similarly, materials may be selected in fabrication of the header pipes of the modules, described above, for cost effectiveness in a given set of operating conditions. Since the preferred examples are described using water as the heat exchange liquid media in the collector elements, steel or copper have been selected for ease of fabrication or corrosion resistance or protection against electrolytic effect in the system. The invention is not limited to such materials, however. The one advantage of the invention must be observed. The liquid is confined in the solar collector apparatus for flow between the point of collector of the energy in the system and to a transfer point in the part of the system in which the energy is either utilized or stored.

THE MANIFOLD

As best shown in FIG. 3, the manifold 12 is comprised of complementary upper and lower half sections 30 and 31, respectively, of modular length. Each of sections 30 and 31 are preferably molded in the following fashion. A sheet molding compound (SMC) in sheet form is first draped over the mold cavity and heated to a pliable, softened consistency. The SMC is then pressed into the cavity of the mold setting the exterior skin layer 32 of each piece. The SMC material is one that is commercially available from several manufacturers, such as W. R. Grace Company and Owens-Corning Fiberglas Corporation. Such material is comprised of a polyester composition that is reinforced with imbedded fibers or strands of glass (fiberglass). The polyester is a thermosetting plastic compound. After the SMC skin layer is shaped in the mold cavity, it is cured under sufficient temperature, well known in the art, for a time (such as 20–30 seconds) to render the thermosetting plastic rigid. The result is the exterior skin layer 32, represented specifically on FIG. 4, which forms a durable, dense, non-porous exterior covering for the manifold. Any desired pigmentation or color may be blended into the SMC material for an attractive appearance of the manifold. At the time of molding skin 32, just described, the cavity of the mold used incorporates the contour for forming the leg supports 33 for the manifold (see FIGS. 2–4), which are disposed at the longitudinal ends of lower half section 31. Thus, the underside support brackets for each modular manifold length are made integral with skin layer 32 and from the same reinforced thermosetting material.

After the SMC material is molded to shape and cured in the mold, the shell of the skin 32 provides a cavity into which is molded a matrix of low density thermal insulating material, such as foamed polyurethane of 4–6 lbs. per cubic foot density. The foamed polyurethane material is placed in the hollow interior of the shape formed as skin 32 and molded to a contour by known technique, such as by a die platten having cores and channel, for shaping the interior cavity portions of the modular manifold sections 30 and 31. As seen on FIG. 3, the insulation material is molded to shape two side-by-side, longitudinally extending channels 34 and 35 in lower section 31 for receiving two header pipes 36 and 37, respectively. At the lateral outside edges of channels 34 and 35 there are two smaller, spaced-apart, lateral, parallel channels 38 and 39 of approximately semi-circular configuration through each end wall 40 of the recessed semi-circular cavity wall 41 formed in the insulation and skin layer 32. There are several of these shaped cavity walls 41, 40 along each longitudinal side of manifold 12 for receiving the open end of a double-walled glass collector tube 13. The spaced, parallel, lateral channels 38 and 39 in each collector tube aperture wall are provided in complementary matching fashion in both the upper and lower manifold sections 30, 31 so that, in a juxtaposed relationship of the sections, the channels 38, 39 will receive and surround the legs 26A and 26B, respectively, of U-tube 26.

In the formation of skin layer 32, there is also formed a semi-circular flange 42 having a gasket receiving groove 43 formed thereby around the edge of the collector-tube receiving aperture. A circular rubber grommett 44 is seated in the combined upper and lower semi-circular grooves 43 which retain the annular gasket 44 when the sections 30, 31 are juxtapositioned in their assembly (such as shown at the right-hand side of FIG. 3). The upper half 30 is fastened to the lower half section 31 by a horseshoe style of U-clamp 45 comprised of the thermosetting polyester material to match the skin 32. Clamp 45 has some resiliency and is forced over the upper half section 30 at opposite ends of the module length thereof. Lateral, spaced apart exterior ribs 46 are formed integral on skin 32 at the ends of section 30. The ribs 46 of adjacent manifold module lengths receive a clamp 45 to locate it with stability and guide it to its seat on the lower section 31 which is comprised of integral exterior lugs 47 on the skin layer 32 thereof. As shown at the right side of FIG. 3, one lug 47 is in circumferential alignment with its opposite rib 46 at each end of section 31 and the inner facing, spaced cam lugs 48 on each of the depending ends of horseshoe clamp 45 snap over a lug 47. This snap fit holds the top section 30 onto lower section 31 closing the manifold about the header tubes 36 and 37 and the U-tube serpentine comprised of the series of U-tubes 26 and lengths of tubing 26D interconnecting one U-tube to the next. The downwardly depending spaced edges 49 of clamp 45 fit along the opposite outside edges of the ribs 46 of adjacent manifold lengths and clamp the two together in end-to-end abutting attachment.

The tube serpentine formation (the series of U-tubes 26 and intermediate lengths 26D connecting them together) is made to correspond in its number of U-tubes and in its U-tube center-to-center spacing with the center spacing of the number of circular pockets 41 for the collector tubes 13 along one side of the manifold. These tube pockets are defined by the walls 40, 41 inwardly of the grommet flange 42 in each of the modular lengths of the manifold, as described earlier. The forward (inlet) end of the left side serpentine of the manifold is connected to threads 50A of a connector block 50 on header pipe 36 (FIG. 5) by a flared, threaded pressure fitting 51 (phantom outline on FIG. 7). Connector block 50 has a curved, contoured lower face and is welded onto the periphery of inlet header pipe 36 to align the radial passage 52 in the block with a punched aperture 53 in the wall of header pipe 36. Passage 52 forms a T-connection with the lateral passage 54 in block 50 and passage 54 has the female threads 50A in the block at each end thereof for fastening the threaded serpentine end fittins 51 and 55, respectively. The fitting 55 is the inlet end threaded fitting on the right hand serpentine (FIG. 3). Thusly, the two serpentine tubing formations for the right and left hand sides of the collector manifold are connected into the inlet header pipe 36. Similarly, the outlet ends of each of these serpentine tubing formations are connected into a connector block 56 (constructed the same as block 50) which is welded onto outlet header pipe 37 over a punched aperture therein located along the manifold near its far end. In the fashion described for the inlet connection, the other terminal end of each of the two serpentine tubing formations are pressure-fitting connected into the lateral passage of connector block 56 which in turn is internally connected to outlet header pipe 37. The interior web 59 of the low density insulation between pipe channels 34 and 35 formed therein is provided with similar recesses 60 to receive the block connectors 50 and 56, respectively, adjacent opposite ends of the module.

Figure 2:
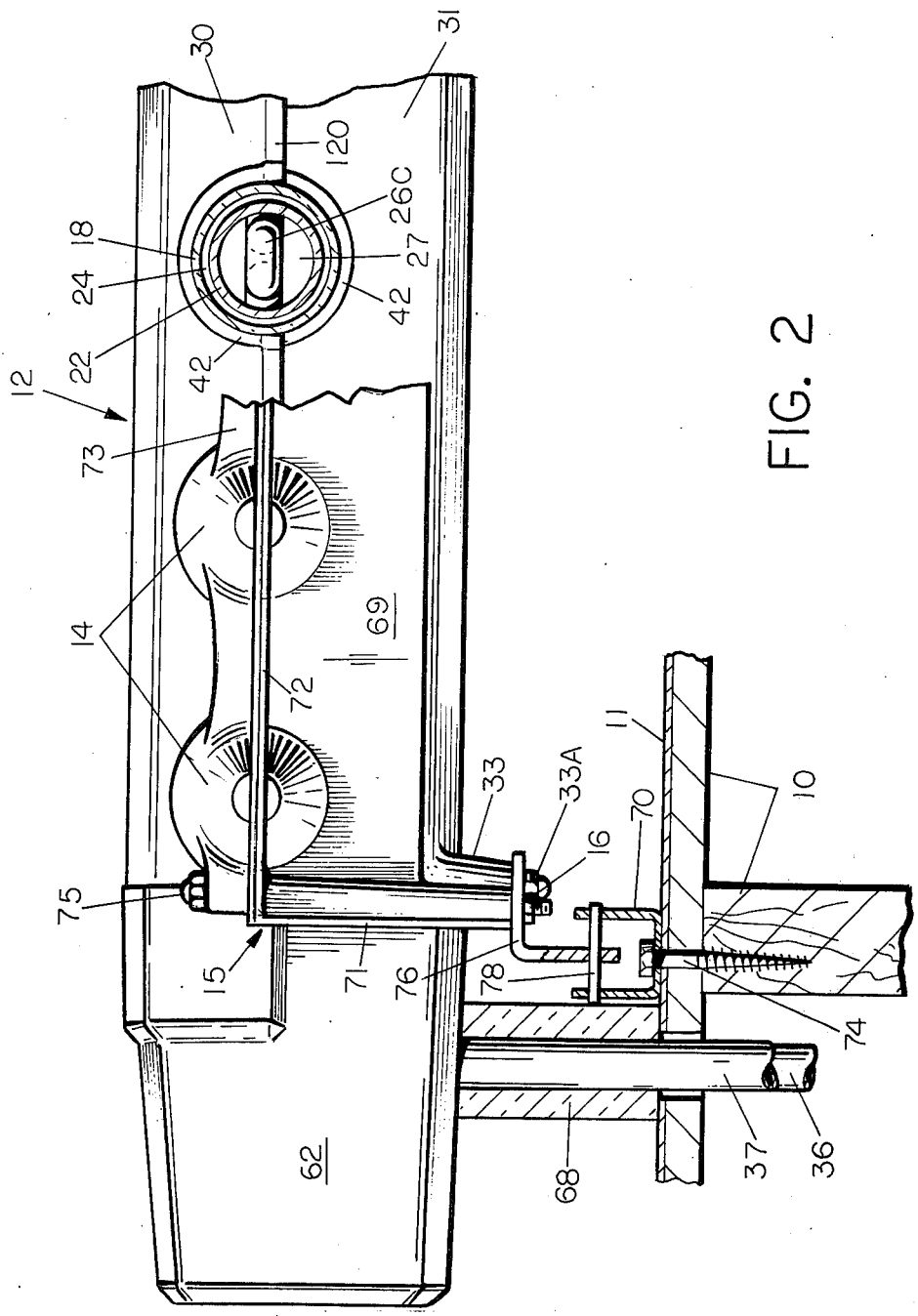
FIG. 2 is a side elevational view, partly broken away, showing the modular unit of collectors of FIG. 1 installed on the structural modular frame installed at a site exposed to solar radiation.

Any number of the manifold module lengths may be connected end-to-end by the pipe couplers 57 and 58 for connecting the far end of the inlet header pipe 36 and outlet header pipe 37, respectively, to the near end of the same elements 36, 37 (superimposed in phantom outline at the right-hand side of (FIG. 3) in the next module of the manifold. On the far end of the last module in an installation, end caps (not shown) replace the pipe couplers 57 and 58. With the just described connections made, the manifold sections 30, 31 are closed along an overlapping seam line 120 (FIG. 2). Each of the serpentine tubing formations is now connected to the inlet header pipe 36 at one end to the outlet header pipe 37 at the other end. A liquid heat exchange media supply in the system installed for utilization of collected solar energy may be connected, as the inlet to the collector at the pipe 36. A suitable liquid for this purpose is water, which has a high specific heat. By forcing flow of the liquid in the system, such as by a power driven pump, the liquid is introduced by the inlet header pipe 36 into each of the tubing serpentines of the system for flow successively through each of the U-tubes 26 in the collectors 13 disposed along one side of each module. By exchange of the solar energy collected by the tubular collectors 13 as heat to the liquid in the closed tubing 26, the energy is carried from each of the serpentines into the outlet header pipe 37, which is in turn connected into the system receiving the energy.

The pipes 36 and 37 are held in a block 61 (FIG. 3) of insulation material and a formed end cap 62 is fastened onto the one end face 63 of the assembled manifold. A suitable assembly of end cap 62 is by an RTV, silicone rubber adhesive which cures at room temperature. Such adhesives are commercially available. End cap 62 is made the same as the sections 30, 31 in that an SMC material is molded as the high density outer skin (32) thereof and a low density core of the foamed polyurethane insulation material is formed to a shape inside this skin or shell. An appropriate recess 61A (shown by dotted outline) in the body of the end cap is molded to receive insulator block 61 and the bend portions of pipes 36 and 37. Suitable insulation about the pipes 36, 37 emanating below end cap 62, such as shown at 68 on FIG. 2, will of course be provided to avoid unnecessary heat loss in the circulation of liquid through the system.

As best shown on FIGS. 2 and 4, the several tubular collectors 13 assembled as earlier described herein are inserted over the U-tubes 26 depending outwardly from the manifold aperture at flange 42. The open end of tube 13 butts against the insulation wall 40 at the back of the tube pocket 29 in the manifold and by this means substantially closes the open end of the collector tube. The atmosphere inside the tube is enclosed and is non-turbulent (dead air space). This provides the media to transfer energy (heat) absorbed on the coating of tube 22 inside the collector chamber 27 to the U-tube 26 and in turn to the liquid circulated therein. The double wall section (18, 22) at the end of each collector tube 13 is inserted within the manifold pocket such that the grommet gasket 44 annularly engages the outer surface of cover tube 18 in a cross-sectional area of the double-wall tube that includes the annular vacuum chamber 24 formed by the two glass walls (18, 22). This is important to prevent heat loss by the collector through conduction and convection, i.e. a vacuum jacketed, insulated part of the collector tube 13 is inside the grommet 44 in the manifold aperture pocket and sealed by the gasket 44.

The outer closed end 19 of the collector's cover tube 18 is supported by the end cap 14 and bracket 15 in the following manner. The closed end 19 of the glass cover tube 18 is preferably tapered to a substantially conical shape that includes tubulation 25 through which the vacuum is pulled to evacuate the annular chamber 27 between the tube walls 18 and 22. There is a plastic end fitment 65 (FIG. 4) placed over the end of the sealed tube on glass end portion 19 thereof which protects the glass surface from abrasion, scratching and abuse in service. This fitment includes the series of inwardly facing annular ribs 66 engaging the glass. The open, large end of fitment 65 includes an annular, outwardly projecting, ring-like end enlargement 67 of the fitment. The bulletshaped outer end cap 14 is made in split configuration and encircles the end fitment 65 engaging the latter securely so as to somewhat compress the ring-like portion 67 of the fitment annularly against the glass surface of cover tube 18. The end cap 14 is held in the engagement just described on the end bracket 15 in the following manner. Bracket 15 is comprised of its upstanding legs 71 at either longitudinal end thereof. The lower end of leg 71 is bolted onto the beams 76 of the modular frame (to be presently described) by a pair of lower bolts 16. Spanning between the legs 71 at either end of the bracket there is an integral lower web section 69 including the spaced apart, semi-circular halves of the end cap. The axial centers of the end caps are coaxially located with respect to the centers of the respective installed collector tubes supported by the manifold. First the collector tubes inserted over tubes 26 and in the manifold pockets 29 rest in place on the lower section of the truncated outer caps 14. Next, an upper, retainer member 73 is placed onto the matching top lip 72 of section 69. The retainer member 73 includes corresponding semi-circular truncated halves which match with the semi-circular lower halves and together from the end cap 14 for each collector 13. The retainer member 73 is securely fastened at the ends onto the legs 71 and section 69 by cap screws 75. The assembled end bracket 15 and the encircling end caps 14 hold each collector tube firmly in position. In the present invention, there is no requirement for the end cap to provide an axial compression load on the collector tube to retain it in the manifold, there being no internal pressure applied inside the absorber tube chamber 27 to tend to force the collector tube axially out of the manifold. Accordingly, the force placed on the end of the collector tube by the end mounting, just described, need only be sufficient to firmly support the tube against vibration as may be caused by exterior forces, such as wind and weather.

MODULAR ASSEMBLY

The manifold 12, collectors 13 and end bracket supports 15 are incorporated into a modular assembly, as shown on FIGS. 1-4. A pair of cross beams 76 of structural material, such as steel or aluminum, are placed parallel and manifold lower section 31 is bolted in place on the flange of the beams by studs 33A molded into legs 33. These beams 76 are preferably selected according to the following. The end module of an installation includes an L-shaped beam at one end. Intermediate modules are constructed with a T-shaped beam having the wider web at the top thereof. Adjacent module assemblies have the manifold legs 33 bolted onto the same web of the T-beam. Similarly, the end bracket 15 has its legs 71 bolted to the top web spaced beams 76. The reflector sheet 11 is installed on the frame work 10, such as the roof of a building. Over sheet 11 there are two U-shaped brackets 70 each fastened by a screw 74 through the reflector. The brackets 70 are installed as pairs aligned to receive each of the beams 76 and support them in parallel fashion.

As seen on FIGS. 1, 2 and 4, each bracket 70 has a slot 77 in the upright sides thereof which receives a pin 78. Pin 78 is inserted through a hole provided in the proper location on the vertical section of the beams 76. Thus, the modular units of the apparatus after assembly over the beams 76 are hoisted to the brackets 70 and supported by the pins 78 fitted into the proper slots 77 of the U-brackets 70.

This construction permits ground site assembly of all of the parts of a module assembly of the solar collector apparatus. This assembled module may then be hoisted into place on a solar exposure site of a building or framework and there fastened into place. Of course, the liquid connections to the header pipes 36 and 37 will be made after the module or modules are located in place and fastened together. Thus, the system is connected for circulation of the liquid through the several serpentines of tubing by flow between the inlet and outlet header pipes. The flow rate of the liquid on the installation framework (or building) will be limited to the volume of the header pipes and the serpentine tubing of the particular installation. This volume is less in weight than the liquid collectors utilized heretofore in which liquid flow through the system filled the absorber tubes and manifolding at all times. Moreover, breakage of a tube collector of the module will not result in loss of liquid or malfunction of the module. Since the liquid is confined in this serpentine tubing circuit and the header pipes, the loss of liquid or potential damage by spilled liquid is obviated.

Also, the closed system for liquid in the present invention permits design of very high pressure units — up to 3000 PSI — and at very high temperatures — in the area of 1600° F — enabling use of the solar collector apparatus in power generating applications.

SECOND EMBODIMENT

As shown on FIGS. 10–12, the serpentine array of tubing 260 may be constructed such that the depending legs 261 and 262 depend outwardly from the connector section of tubing 263 in an over and under relationship. The reverse, U-bend portion 264 of the tubing at the far end of each U-tube is twisted, that is, the section 263 at one end lies in a plane 90° from the plane at the bend 264. Thus the serpentine of tubing which, in the first embodiment, lay principally along one plane, this serpentine construction has the U-tube bent into two planes at right angles to each other (see FIG. 12).

This form of the invention has advantages in providing a fall or drop for the liquid in the U-tubes for draining them if desired. The performance and efficiency of the collector remains about the same as in the first embodiment. The assembly of the tubing serpentine into the glass, double-wall tube collectors 13 is the same as before. The cut-outs in the manifold matrix (best seen at 38, 39 on FIG. 3) utilized in the first embodiment may need to be revised to correspond with this modification. Essentially, the balance of the apparatus of the invention described earlier herein remains the same.

The module concept herein described and included in the preferred embodiment, utilizes the tubular solar energy collectors depending from both longitudinal sides of the manifold. It is also within the scope of the invention to arrange the manifold such that the collectors depend along but one side thereof. Further, the manifold may be structured under this invention to a form other than a straight, elongated figure, should a particular solar exposure structure or installation be better suited to a modification of this style.

Other and further modifications may likewise be resorted to without departing from the spirit and scope of the appended claims.

What is claimed is:

1. A solar energy collection apparatus comprising
a hollow transparent cover tube closed at one end,
a hollow absorber tube closed at one end having a lesser outside dimension than the inside dimension of the cover tube and disposed within the latter and providing a space therebetween, the absorber tube having a solar energy absorbing surface comprised of a wave length selective coating exposed to solar radiation,
means sealing the space between said cover and absorber tubes near their other ends, said space being evacuated to subatmospheric pressure,
an elongated, continuous fluid conducting tubing that is non-reflective of thermal radiation comprised of two lengths thereof disposed adjacent each other and interconnected to each other at one end through a reverse bend portion, said two lengths and reverse portion being positioned in the absorber tube surrounded by the absorbing surface and extending along a major portion of the axial length thereof, and
a fluid supply means connected to one of the two lengths of the fluid conducting tubing for circulating a fluid therethrough.

2. The apparatus of claim 1 which includes means closing the other end of the absorber tube, and surrounding the two lengths of said tubing extending within the absorber tube through said closing means, whereby the interior of the absorber tube contains the fluid conducting tube and a quiescent gaseous atmosphere.

3. The apparatus of claim 2 which includes a manifold comprised of a cellular, low density insulation material, the sealed other ends of the cover tube and absorber tube being disposed in said manifold and encircled by said insulation material thereof, and an annular seal on the manifold peripherally sealingly engaging the cover tube near its said other end 4. The apparatus of claim 1 in which the two tubing lengths positioned in the absorber tube are spaced apart from each other.

5. The apparatus of claim 1 in which said fluid tubing is a metal tubing which includes a thermal radiation non-reflecting exterior surface coating thereon within the absorber tube.

6. The apparatus of claim 5 wherein the elongated fluid conducting tubing is comprised of steel tubing.

7. The apparatus of claim 5 wherein the elongated fluid conducting tubing is comprised of copper tubing.

8. The apparatus of claim 5 wherein the elongated fluid conducting tubing is comprised of aluminum tubing.

9. The apparatus of claim 1 wherein the said elongated fluid conducting tubing is comprised of glass tubing.

10. The apparatus of claim 1 wherein the fluid circulated in said conducting tube from said supply means comprises water.

11. A solar energy collector module comprising a plurality of tubular collector elements having the same outside diameter and each including a circumferentially transparent outer tube having a closed end and an open end, and, interiorly of said outer tube, a hollow elongated absorber tube radially spaced from said outer tube, having a closed end and an open end and including a solar energy absorbing surface disposed between its ends, said absorbing surface comprising a wave length selective coating thereon, means annularly sealing the outer tube and the absorber tube together adjacent the open end of one of the said tubes to provide a closed annular space between the two, said space being evacuated to sub-atmospheric pressure, the absorber tube having an interior chamber,
an elongated manifold having lateral, outwardly facing apertures for receiving the open ends of said tubular collector elements, each said aperture including means interiorly of the manifold for closing the open end of the absorber tube and providing an enclosed atmosphere within the interior chamber thereof, plural U-shaped elongated fluid tight tubes that are non-reflective of thermal radiation and supported in said manifold, each extending through said absorber tube end closure means of the manifold and along a substantial longitudinal portion of said interior chamber of each of the absorber tubes of the collector elements received by the manifold, fluid conduit means in the manifold connecting the U-tubes in series, a working fluid supply means connected to one of the U-tubes for introducing a working fluid to the series of U-tubes and in heat exchange relationship respectively with the interior chamber of the series of absorber tubes, and means connected to the series of U-tubes for receiving circulated, heated fluid therefrom.

12. The apparatus of claim 11 in which said plural U-tubes and said fluid conduit means connecting the U-tubes in series comprise a continuous serpentine formation of tubing, one end of said serpentine tubing being connected to the working fluid supply means and the other end thereof connected to said means for receiving circulated heated fluid.

13. The apparatus of claim 12 in which said working fluid supply means comprises an inlet header conduit in the manifold and the means for receiving circulated, heated fluid from the serpentine tubing comprises an outlet header conduit in the manifold.

14. The apparatus of claim 13 in which the serpentine formation comprises steel tubing and the inlet header conduit and the outlet header conduit each comprise steel pipe.

15. The apparatus of claim 13, in which said serpentine formation comprises copper tubing and the inlet header conduit and the outlet header conduit each comprise copper pipe.

16. The solar energy collector module of claim 12 in which said serpentine formation of tubing is disposed substantially in one plane.

17. The solar energy collector module of claim 12 in which said serpentine formation of tubing is disposed in plural planes, the U-tubes of said series thereof lying in substantially parallel planes and the tubing connecting said U-tubes in series lying in a plane that is angularly disposed and intersecting all of said plural parallel planes.

18. The solar energy collector module of claim 11 in which the U-tubes are each comprised of metal and include an exterior surface layer of blackened oxide material thereon rendering such U-tubes substantially non-reflecting of thermal radiation.

19. The solar energy collector module of claim 11, in which the elongated manifold is comprised of a shaped body of cellular, low density insulation material and an exterior skin over said shaped body of a substantially rigid, non-porous, durable, high density material.

20. The solar energy collector module of claim 19 wherein the body of insulation material comprises foamed polyurethane having an average bulk density in the range 2-4 lbs. per cubic foot, and said high density skin is comprised of an exterior layer of fiberglass reinforced, polyester material overlying the body of said insulation.

21. In a solar energy collector apparatus, the combination of a support surface for said apparatus exposed to sunlight, a manifold means adapted to be connected to said support, a tubular solar collector comprised of a hollow double walled glass tubular collector member having its walls spaced apart and the space therebetween evacuated to subatmospheric pressure, the inner wall thereof including a wave length selective coating thereon, said collector being open at one axial end and in operating engagement thereat with the manifold and closed at its opposite axial end, end support means engaging the tubular collector member adjacent its closed end adapted for firmly supporting said tubular collector member in a spaced relationship above said support surface, said manifold means comprising an elongated, hollow, fluid conducting shaped tubing of a thermally conductive and thermally non-reflective material having two elongated portions connected at their one end by a bight portion and which extends interiorly of said collector member substantially the axial length of the latter and the other opposite ends of the two elongated portions depend outwardly from its open axial end, and a body of thermally insulating material surrounding the open axial end of said collector member and the outwardly depending other end portions of said two elongated portions of shaped tubing, and a heat exchange media in said shaped tubing adapted for flow throughout the length thereof.

22. The apparatus of claim 21 in which the end support means comprises an end cap inserted over the closed end of said tubular collector and annularly engaging the exterior thereof, a support bracket adapted to be fastened to said support surface and depend therefrom spaced along the tubular collector from said manifold, said bracket including a split housing for receiving said end cap therein comprised of a semi-circular portion integral with said bracket and a complementary semi-circular portion, and means for fastening said semi-circular housing portions together in encircling engagement on said end cap.

23. The apparatus of claim 22 which includes means for fastening said manifold and said support bracket to said support surface and firmly supporting the tubular collector member in operating position spaced above the support surface ans parallel therewith.

24. A modular solar energy collector apparatus comprising a pair of spaced, parallel beams, an elongated manifold means disposed between said beams, means connecting the manifold to each of the beams intermediate their ends, a plurality of elongated, tubular solar collectors disposed in equally spaced array on opposite sides of said manifold, one end of each of the collectors being inserted into operating engagement with the manifold and supported thereby, end support means oppositely disposed in spaced relation on opposite sides of the manifold and engaging the outer ends of the collectors thereat for firmly supporting the collectors, the end support means and manifold positioning the tubular collectors substantially parallel with said beams, said end support means on either side of the manifold comprising an elongated bracket assembly fastened to each of the parallel beams and including an integral lower bracket element, spaced, semi-circular, up-turned, contoured collector rests for nesting said collectors spaced along said lower bracket element corresponding with said collector spacing, and an elongated, upper bracket element having spaced, semi-circular, down-turned, contoured collector rests corresponding to said up-turned rests and means for detachably connecting said upper element over said lower element for encircling of the collectors by said combined semi-circular rests thereof for firmly supporting the closed ends thereof in operating position.

25. The apparatus of claim 24 which includes an end cap over the closed end of each of said tubular collectors, said end cap being engaged and encircled by said upper and lower bracket elements and compressed annularly against the exterior of the tubular collectors thereby.

26. The apparatus of claim 25 in which the end cap over the tubular collectors each comprise a plastic frusto-conical cup having a plurality of radially inwardly directed fins on the inside surface thereof, said fins engaging the surface along the closed end portion of the collector.

27. The apparatus of claim 26 wherein the collectors each comprise a transparent glass cover tube having a tapered, substantially frusto-conical closed end.

28. A solar energy collector apparatus comprising plural double-wall glass tube collectors each having a wave length selective coating on the inner wall thereof defining a solar energy absorbing surface disposed between one closed end and the other open end thereof, the outer wall being transparent, the double walls defining a sealed annular space under vacuum, an elongated manifold having juxtaposed, split complementary halves of cellular insulating material and having a rigid, dense, non-porous exterior skin layer over said insulating material, a continuous serpentine of thermally conductive tubing comprised of a plurality of series inter-connected shaped U-tubes, separate longitudinally disposed inlet and outlet header pipes in said manifold, means connecting one end of said serpentine of tubing into said inlet header pipe and means connecting the other end of said serpentine of tubing into said outlet header pipe, each of said glass tube collectors encircling a shaped U-tube portion of the serpentine tubing, and the balance of said serpentine of tubing depending from the open end of each double-wall glass tube collector and enclosed by said juxtaposed manifold halves, the open end of each said collector also being inserted into the manifold and said end opening substantially closed thereby, the opposite closed end depending laterally from said manifold, said enclosed U-tube portion in each of the double-wall collectors having a thermally non-reflecting exterior surface, the interior of the tube collectors containing a non-turbulent atmosphere of gaseous media surrounding said U-tube portion therein, and a liquid supply adapted to be connected to said inlet header pipe for filling said inlet header pipe, said serpentine of tubing and said outlet header pipe.

29. The solar energy collector apparatus of claim 28 wherein the liquid is essentially comprised of water.

30. The solar energy collector apparatus of claim 28 in which said serpentine of tubing is comprised of formed copper tubing.

31. The solar energy collector apparatus of claim 28 in which said serpentine of tubing is comprised of formed steel tubing.

32. The solar energy collector apparatus of claim 28 in which said manifold insulation is comprised of low density, foamed polyurethane and said exterior skin layer thereon is comprised of a fiberglass reinforced, polyester material.

33. The solar energy collector apparatus of claim 28 wherein said apparatus is connected to a frame comprised of parallel end beams extending laterally of the manifold adjacent the ends thereof, said manifold being fastened securely to said beams, an end support bracket spanning said beams on opposite sides of the manifold and including end caps over the closed ends of the tube collectors fastened to said support bracket, the end support bracket being fastened to each of said parallel end beams, whereby said collector apparatus is mounted thereon as a module.

34. The solar energy collector apparatus of claim 28 wherein said serpentine of tubine is disposed substantially in a single plane.

35. The solar energy collector apparatus of claim 28 wherein the shaped U-tubes of said serpentine are each disposed in a plane that is angularly disposed from the plane of the balance of said serpentine of tubing.

36. In an elongated, tubular solar collector apparatus having a double-wall glass tube and a sealed annular space between the walls at subatmospheric pressure, said tube having a closed end and an open end, the inner wall thereof defining a tubular chamber closed at the one end and open at the other end and encircled by the said annular space at subatmospheric pressure, the outer wall being transparent to solar radiation, the improvement therein comprising a solar energy absorbing, wave length selective surface coating on the inner wall of said double-wall tube and substantially covering said tubular chamber of the inner wall, an elongated, continuous, bent tubing that is non-reflecting in thermal radiation and having an O.D. that is substantially smaller than the diametrical dimension of the said tubular chamber of the double-wall tube and formed to a configuration having two elongated portions connected to each other through a bight portion at one end of said tubing formation and separate from each other at the opposite end thereof for inlet and outlet, respectively, of a fluid adapted for flow therethrough, said formed tubing being disposed inside said chamber of the double-wall tube and extending along a substantial portion of the length of said chamber, and a quiescent gaseous heat transfer media in said tubular chamber and surrounding said formed tubing therein, the latter being fluid tight for circulation of fluid media through the tubular chamber of said double-wall tube and extract thermal energy therefrom.

37. The improved solar collector apparatus of claim 36 in which the bent tubing disposed in said tubular chamber is U-shaped and the elongated side-by-side portions thereof are spaced apart.

38. The improved solar collector apparatus of claim 37 wherein the formed U-shaped tube is comprised of glass.

39. The improved solar collector apparatus of claim 37 wherein the formed U-shaped tube is comprised of a ductile metal and includes a blackened layer on the exterior surface thereof.

40. The improved solar collector apparatus of claim 39 in which the ductile metal U-shaped tube is selected from one of the group of metal tubings consisting of copper, brass, steel, steel alloy, stainless steel, and aluminum.

41. The improved solar collector apparatus of claim 39 in which the blackened layer on the exterior surface of said ductile metal U-shaped tube is a single layer selected from one of the group of metal oxides consisting of copper oxide, nickel oxide, zinc oxide and iron oxide.

* * * * *